(12) United States Patent
Vaidyanathan et al.

(10) Patent No.: US 7,865,898 B2
(45) Date of Patent: Jan. 4, 2011

(54) REPARTITIONING PARALLEL SVM COMPUTATIONS USING DYNAMIC TIMEOUT

(75) Inventors: Kalyanaraman Vaidyanathan, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1377 days.

(21) Appl. No.: 11/341,000

(22) Filed: Jan. 27, 2006

(65) Prior Publication Data

US 2007/0179927 A1    Aug. 2, 2007

(51) Int. Cl.
G06F 9/46 (2006.01)
G06F 15/76 (2006.01)
(52) U.S. Cl. .......................................... 718/105; 712/7
(58) Field of Classification Search ................ 718/105; 709/201; 712/7
See application file for complete search history.

(56) References Cited

U.S. PATENT DOCUMENTS

| | | | |
|---|---|---|---|
| 6,526,433 B1 * | 2/2003 | Chang et al. ................. | 709/201 |
| 6,791,945 B1 * | 9/2004 | Levenson et al. ............ | 370/235 |
| 7,650,331 B1 * | 1/2010 | Dean et al. ................... | 712/203 |
| 2003/0233403 A1 * | 12/2003 | Bae et al. .................... | 709/203 |
| 2004/0059805 A1 * | 3/2004 | Dinker et al. ............... | 709/223 |
| 2004/0225443 A1 * | 11/2004 | Kamps ........................ | 702/14 |

OTHER PUBLICATIONS

Dean, J., and Ghemawat, S. MapReduce: Simplified Data Processing on Large Clusters. OSDI'04: Sixth Symposium on Operating System Design and Implementation [online], Dec. 2004 [retrieved Feb. 3, 2010]. Retrieved from the Internet:<URL: http://labs.google.com/papers/mapreduce-osdi04.pdf>.*

Allen, et al. "Adaptive Timeout Discovery using the Network Weather Service". Proceedings of the 11th IEEE International Symposium on High Performance Distributed Computing, HDPC-11, 2002.*

* cited by examiner

*Primary Examiner*—Lewis A Bullock, Jr.
*Assistant Examiner*—Brian Chew
(74) *Attorney, Agent, or Firm*—Park, Vaughan, Fleming & Dowler LLP

(57) ABSTRACT

A system that reduces execution time of a parallel SVM application. During operation, the system partitions an input data set into chunks of data. Next, the system distributes the partitioned chunks of data across a plurality of available computing nodes and executes the parallel SVM application on the chunks of data in parallel across the plurality of available computing nodes. The system then determines if a first timeout period has been exceeded before all of the plurality of available computing nodes have finished processing their respective chunks of data. If so, the system (1) repartitions the input data set into different chunks of data; (2) redistributes the repartitioned chunks of data across some or all of the plurality of available computing nodes; and (3) executes the parallel SVM application on the repartitioned chunks of data in parallel across some or all of the available computing nodes.

20 Claims, 3 Drawing Sheets

REPARTITIONING PARALLEL SVM COMPUTATIONS USING DYNAMIC TIMEOUT

BACKGROUND

1. Field of the Invention

The present invention relates to computer-based classification techniques, which are used to identify members of groups of interest within data sets. More specifically, the present invention relates to a method and apparatus for reducing the execution time for parallel support vector machine (SVM) computations.

2. Related Art

Classification and pattern recognition techniques have wide-reaching applications. For example, a number of life science applications use classification techniques to identify members of groups of interest within clinical datasets. In particular, one important application involves distinguishing the protein signatures of patients that have a certain type of cancer from the protein signatures of patients who do not. This problem stems from the need in clinical trials to test the efficacy of a drug in curing cancer while the cancer is at an early stage. In order to do so, one needs to be able to identify patients who have cancer at an early stage.

Conventional diagnostic techniques are not sufficient for this application. A popular technique (from an area that has become known as "proteomics") is to analyze mass spectra, which are produced by a mass spectrometer from serum samples of patients. Depending on the type of cancer, the mass spectra of serum samples can show distinct "signatures," which are not immediately visible to the naked eye. Several existing data mining techniques are presently used to distinguish the cancer spectra from the normal ones, such as Naïve Bayes, Decision Trees, Principle-Components-Analysis based techniques, Neural Networks, etc.

However, these existing techniques are characterized by false-alarm and missed-alarm probabilities that are not sufficiently small. This is a problem because false alarms can cause patients to experience anxiety, and can cause them to submit to unnecessary biopsies or other procedures, while missed alarms can result in progression of an undetected disease.

Support Vector Machines (SVMs) provide a new approach to pattern classification problems. SVM-based techniques are particularly attractive for the cancer classification problem because SVM-based techniques operate robustly for high-dimensional feature data, unlike other techniques which have resource requirements that are closely coupled with feature dimensions.

SVMs can be used in large-scale pattern classification problems, in proteomics problems, and in genomics problems. For example, SVMs can be used to analyze a large database of proteomics "fingerprints" to separate patients who responded to a drug in clinical trials from those who did not respond to the drug. SVMs can also be used to analyze a large database of computer telemetry signals to separate servers that experienced a syndrome from those that did not experience the syndrome.

Another application in which SVMs can be used is to accurately predict the likelihood of customer escalation for reported bugs. For this application, classification is performed using data such as customer information, server type, software patch levels, and the nature of the problem. Yet another application uses pattern classification to predict system outage risk. Data such as system configuration information and reliability, availability, and serviceability (RAS) data are used.

During operation, SVMs find a hypersurface in the space of possible inputs such that the positive examples are split from the negative examples. The split in a multi-dimensional feature space is chosen to have the largest distance from the hypersurface to the nearest of the positive and negative examples. The nearest examples, which are vectors in multi-dimensional space, are called "support vectors."

SVMs operate in two stages: (1) during a kernel mapping stage, a kernel function is used to map the data from a low-dimensional input space to a higher-dimensional feature space, and (2) during a subsequent optimization stage, the system attempts to find an optimal separating hypersurface in the feature space.

SVM memory requirements scale roughly with the square of the number of input vectors, whereas the central processing unit (CPU) requirements scale with the number of input vectors to the 2.8 power. Therefore, it is advantageous to distribute SVM computations across multiple computing nodes. In such a parallel distributed environment, the data is partitioned into pieces or "chunks" and the SVM program operates on each chunk in parallel on separate computing nodes. The results from each chunk are subsequently aggregated and the SVM is run one more time on the combined results to arrive at the final solution.

Unfortunately, the execution time of the optimization step in the SVM application is unpredictable and can result in one or more chunks which take a disproportionately long time to complete, thereby adversely affecting the completion time of the whole SVM program. In fact, individual computing nodes can get stuck in their optimization step for so long that the distributed problem takes longer to complete than if the entire problem were run on a sequential machine.

Hence, what is needed is a method and an apparatus for limiting the execution time of SVM computations in such situations.

SUMMARY

One embodiment of the present invention provides a system that reduces execution time of a parallel SVM application. During operation, the system partitions an input data set into chunks of data. Next, the system distributes the partitioned chunks of data across a plurality of available computing nodes and executes the parallel SVM application on the chunks of data in parallel across the plurality of available computing nodes. The system then determines if a first timeout period has been exceeded before all of the plurality of available computing nodes have finished processing their respective chunks of data. If so, the system (1) repartitions the input data set into different chunks of data; (2) redistributes the repartitioned chunks of data across some or all of the plurality of available computing nodes; and (3) executes the parallel SVM application on the repartitioned chunks of data in parallel across some or all of the available computing nodes.

In a variation on this embodiment, if the first timeout period has been exceeded before all of the plurality of available computing nodes have finished processing their respective chunks of data, then prior to repartitioning the input data set into different chunks of data, the system cancels the execution of the parallel SVM application and deletes results of the parallel SVM application.

In a variation on this embodiment, while determining if the first timeout period has been exceeded before all available computing nodes have finished processing their respective chunks of data, the system determines if a portion of the plurality of available computing nodes have completed processing associated chunks of data. If not, the system waits until a portion of the plurality of available computing nodes have completed processing their respective chunks of data. Otherwise, the system computes the mean of the completion times for the portion of the plurality of available computing nodes that have completed processing their respective chunks of data and sets the first timeout period to a constant factor times the mean of the completion times minus the current elapsed time.

In a further variation, the constant factor is three.

In a variation on this embodiment, if the first timeout period has not been exceeded before all available computing nodes have finished processing their respective chunks of data, the system combines the results from each processed chunk of data and executes the parallel SVM application to process the combined results. Next, the system computes the mean of the completion time for all chunks of data and sets a second timeout period to a constant factor times the mean of the completion times for all chunks of data. The system then determines if the second timeout period has been exceeded before the parallel SVM application has completed processing the combined results. If so, the system (1) cancels the execution of the parallel SVM application on the combined results; (2) deletes results of the parallel SVM application; (3) repartitions the input data set into different chunks of data; (4) redistributes the repartitioned chunks of data across the plurality of available computing nodes; and (5) executes the parallel SVM application on the repartitioned chunks of data in parallel across some or all of the available computing nodes. Otherwise, the system outputs the results.

In a variation on this embodiment, while repartitioning the input data set into different chunks of data, the system removes one computing node from the plurality of available computing nodes and repartitions the input data set into chunks of data for the remaining computing nodes in the plurality of available computing nodes.

In a variation on this embodiment, if only a single computing node is available, the system executes the parallel processing application on the single computing node to process the input data set and outputs the result.

In a variation on this embodiment, while partitioning the input data set into chunks of data, the system partitions the input data set so that the number of chunks of data equals the number of available computing nodes.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention reduces the total completion time of an SVM program in a parallel distributed environment by establishing a timeout period for the completion of all chunks of the input data set. For example, the timeout period can be determined empirically from the mean of the completion times of the first half of the computing nodes that finish processing their chunks.

If an SVM problem is distributed in such a manner that one of the chunks gets stuck for a very long time, repartitioning and redistributing the problem increases the likelihood that all chunks will complete more efficiently. Hence, in one embodiment of the present invention, if the timeout period is reached before all chunks have been processed, the SVM problem is repartitioned and redistributed.

Multiprocessor System

Figure 1:
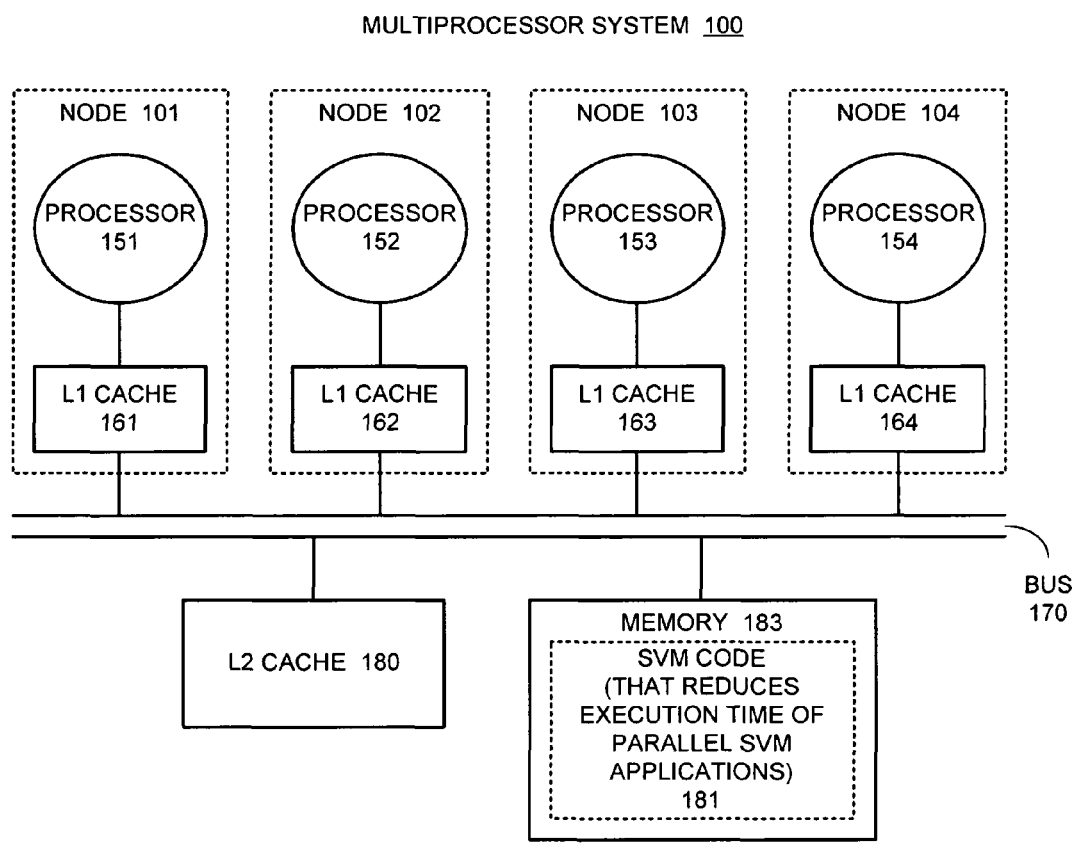
FIG. 1 illustrates a multiprocessor system in accordance with an embodiment of the present invention.

FIG. 1 illustrates an exemplary multiprocessor system 100 in accordance with an embodiment of the present invention. Multiprocessor system 100 is a shared-memory multiprocessor system, which includes a number of processors 151-154 coupled to level one (L1) caches 161-164 which share a level two (L2) cache 180 and a memory 183. Memory 183 contains SVM code 181 that reduces the execution time of parallel SVM applications. This execution time minimization process is described in more detail below.

During operation, if a processor 151 accesses a data item that is not present in local L1 cache 161, the system attempts to retrieve the data item from L2 cache 180. If the data item is not present in L2 cache 180, the system first retrieves the data item from memory 183 into L2 cache 180, and then from L2 cache 180 into L1 cache 161.

Multiprocessor system 100 also supports a coherency protocol that operates across bus 170. This coherency protocol ensures that if one copy of a data item is modified in L1 cache 161, other copies of the same data item in L1 caches 162-164, in L2 cache 180 and in memory 183 are updated or invalidated to reflect the modification.

Although the present invention is described in the context of the shared-memory multiprocessor system 100, the present invention is not meant to be limited to such a system. In general, the present invention can operate in any computer system or distributed system which contains multiple processors. For example, the present invention can operate in a distributed computing system in which separate computing systems are coupled together through a network. Hence, the term "multiprocessor system," as used in this specification and the appended claims, refers to any computer system or distributed system containing multiple processors which can work together on a given computational task.

Reducing the Execution Time of SVMs

Figure 2A:
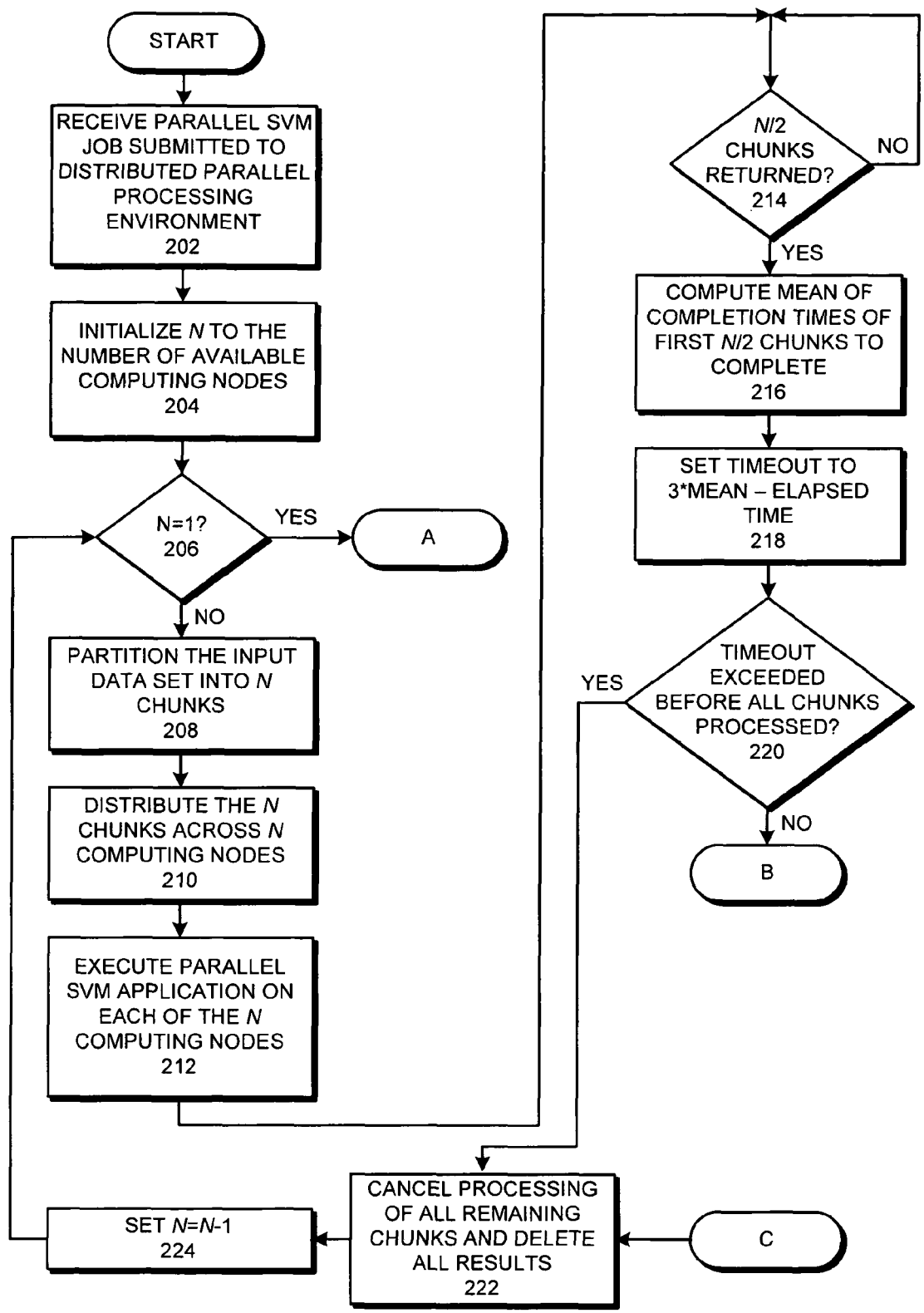
FIG. 2A presents a flow chart illustrating the process of reducing the execution time of a parallel SVM application in accordance with an embodiment of the present invention.

FIG. 2A presents a flow chart illustrating the process of reducing the execution time of a parallel SVM application in accordance with an embodiment of the present invention. The process begins when the system receives an SVM job which is submitted to the distributed parallel processing environment (step 202). In one embodiment of the present invention, the SVM job includes an input data set and a parallel SVM application.

Next, the system initializes n to the maximum number of computing nodes (or processors) which are available (step 204). The system then determines if n=1 (step 206). If so, the process continues to label A in FIG. 2B. Otherwise, the system partitions the input data set into n chunks (step 208) and distributes the n chunks across the n computing nodes (step 210). In one embodiment of the present invention, the input data set is partitioned into n substantially equal-sized chunks of data. Next, the system executes the parallel SVM application on each of the n computing nodes in parallel to process the n chunks (step 212).

Next, the system determines if n/2 chunks have been processed by the computing nodes (step 214). If not, the system returns to step 214 to wait until n/2 chunks have been processed by the computing nodes. Otherwise, the system computes the mean of the time taken for the first half of the chunks to be processed by the computing nodes (step 216). The system then sets the timeout period to three times the mean minus the elapsed time (step 218).

Next, the system determines if the timeout period is exceeded before all of the chunks have been processed (step 220). If not, the process continues at label B in FIG. 2B. Otherwise, the system cancels processing of all of the remaining chunks and deletes all results generated by the parallel SVM application (step 222). The system then sets n=n−1 (step 224). In this way, the system removes one computing node from the available computing nodes. By doing so, when the system returns to steps 206 to 212, the input data set is repartitioned and redistributed in a different manner in attempt to reduce the execution time of the parallel SVM application.

Figure 2B:
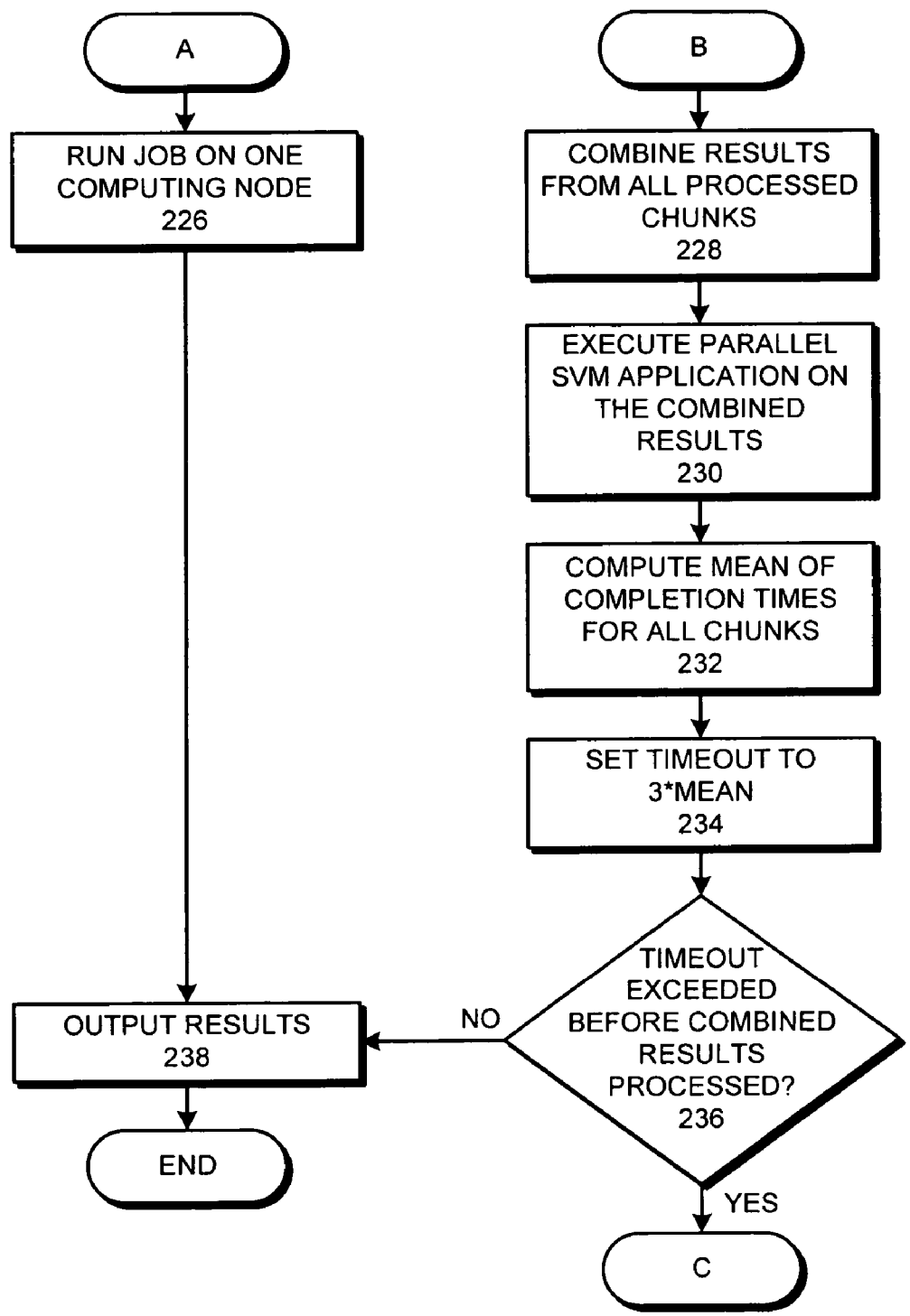
FIG. 2B presents a continuation of the flowchart presented in FIG. 2A in accordance with an embodiment of the present invention.

FIG. 2B presents a continuation of the flowchart presented in FIG. 2A. In FIG. 2B, the process continues at label A in FIG. 2A where n=1. In this case, the system runs the distributed parallel processing job on one computing node (step 226). After the job completes, the system outputs the results (step 238).

The process continues at label B from FIG. 2A if the timeout period was not exceeded before all chunks were processed. In this case, the system combines the results from all processed chunks (step 228). Next, the system executes the parallel SVM application on the combined results (step 230). The system then computes the mean of the completion times for all chunks (step 232) and sets the timeout period to three times the mean of the completion time for all chunks (step 234).

If the timeout period is exceeded before the parallel SVM application has finished processing the combined results (step 236), the system continues the process at label C in FIG. 2A. Otherwise, the system outputs the results (step 238).

In one embodiment of the present invention, execution of the parallel SVM application is automated and hence takes place without human intervention.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reducing execution time of a parallel support vector machine (SVM) application, comprising:
   partitioning an input data set into chunks of data;
   distributing the partitioned chunks of data across a plurality of available computing nodes;
   executing the parallel SVM application on the chunks of data in parallel across the plurality of available computing nodes;
   computing a mean of completion times for a portion of the plurality of available computing nodes that have completed processing their respective chunks of data;
   setting a first timeout period equal to a constant factor times the mean of the completion times minus a current elapsed time;
   determining if the first timeout period has been exceeded before all of the plurality of available computing nodes have finished processing their respective chunks of data; and
   if so,
     repartitioning the input data set into chunks of data that are different from the partitioned chunks of data;
     redistributing the repartitioned chunks of data across some or all of the plurality of available computing nodes; and
     executing the parallel SVM application on the repartitioned chunks of data in parallel across some or all of the available computing nodes.

2. The method of claim 1, wherein if the first timeout period has been exceeded before all of the plurality of available computing nodes have finished processing their respective chunks of data, prior to repartitioning the input data set into different chunks of data, the method further comprises:
   cancelling the execution of the parallel SVM application; and
   deleting results of the parallel SVM application.

3. The method of claim 1, wherein determining if the first timeout period has been exceeded before all available computing nodes have finished processing their respective chunks of data involves:
   determining if a portion of the plurality of available computing nodes have completed processing associated chunks of data;
   if not, waiting until the portion of the plurality of available computing nodes have completed processing their respective chunks of data.

4. The method of claim 3, wherein the constant factor is three.

5. The method of claim 1, wherein if the first timeout period has not been exceeded before all available computing nodes have finished processing their respective chunks of data, the method further comprises:
   combining the results from each processed chunk of data;
   executing the parallel SVM application to process the combined results;
   computing the mean of the completion time for processing all chunks of data;
   setting a second timeout period to a constant factor times the mean of the completion times for all chunks of data;
   determining if the second timeout period has been exceeded before the parallel SVM application has completed processing the combined results;
   if so,
   cancelling the execution of the parallel SVM application on the combined results;
   deleting results of the parallel SVM application;

repartitioning the input data set into different chunks of data;

redistributing the repartitioned chunks of data across the plurality of available computing nodes; and executing the parallel SVM application on the repartitioned chunks of data in parallel across some or all of the available computing nodes; and otherwise, outputting the results.

6. The method of claim 1, wherein repartitioning the input data set into different chunks of data involves:

removing one computing node from the plurality of available computing nodes; and repartitioning the input data set into the different chunks of data for the remaining computing nodes in the plurality of available computing nodes.

7. The method of claim 1, wherein if only a single computing node is available, the method further comprises:

executing the parallel SVM application on the single computing node to process the input data set; and outputting the result.

8. The method of claim 1, wherein partitioning the input data set into chunks of data involves partitioning the input data set so that the number of chunks of data equals the number of available computing nodes.

9. A computer-readable storage medium storing instructions that when executed by a computer cause the computer to perform a method for reducing execution time of a parallel support vector machine (SVM) application, the method comprising:

partitioning an input data set into chunks of data;

distributing the partitioned chunks of data across a plurality of available computing nodes;

executing the parallel SVM application on the chunks of data in parallel across the plurality of available computing nodes;

computing a mean of completion times for a portion of the plurality of available computing nodes that have completed processing their respective chunks of data;

setting a first timeout period equal to a constant factor times the mean of the completion times minus a current elapsed time;

determining if the first timeout period has been exceeded before all of the plurality of available computing nodes have finished processing their respective chunks of data; and if so, repartitioning the input data set into chunks of data that are different from the partitioned chunks of data;

redistributing the repartitioned chunks of data across some or all of the plurality of available computing nodes; and executing the parallel SVM application on the repartitioned chunks of data in parallel across some or all of the available computing nodes.

10. The computer-readable storage medium of claim 9, wherein if the first timeout period has been exceeded before all of the plurality of available computing nodes have finished processing their respective chunks of data, prior to repartitioning the input data set into different chunks of data, the method further comprising:

cancelling the execution of the parallel SVM application; and deleting results of the parallel SVM application.

11. The computer-readable storage medium of claim 9, wherein determining if the first timeout period has been exceeded before all available computing nodes have finished processing their respective chunks of data involves:

determining if a portion of the plurality of available computing nodes have completed processing associated chunks of data;

if not, waiting until the portion of the plurality of available computing nodes have completed processing their respective chunks of data.

12. The computer-readable storage medium of claim 11, wherein the constant factor is three.

13. The computer-readable storage medium of claim 9, wherein if the first timeout period has not been exceeded before all available computing nodes have finished processing their respective chunks of data, the method further comprising:

combining the results from each processed chunk of data;

executing the parallel SVM application to process the combined results;

computing the mean of the completion time for processing all chunks of data;

setting a second timeout period to a constant factor times the mean of the completion times for all chunks of data;

determining if the second timeout period has been exceeded before the parallel SVM application has completed processing the combined results;

if so, cancelling the execution of the parallel SVM application on the combined results;

deleting results of the parallel SVM application;

repartitioning the input data set into different chunks of data;

redistributing the repartitioned chunks of data across the plurality of available computing nodes; and executing the parallel SVM application on the repartitioned chunks of data in parallel across some or all of the available computing nodes; and otherwise, outputting the results.

14. The computer-readable storage medium of claim 9, wherein repartitioning the input data set into different chunks of data involves:

removing one computing node from the plurality of available computing nodes; and repartitioning the input data set into the different chunks of data for the remaining computing nodes in the plurality of available computing nodes.

15. The computer-readable storage medium of claim 9, wherein if only a single computing node is available, the method further comprising:

executing the parallel SVM application on the single computing node to process the input data set; and outputting the result.

16. The computer-readable storage medium of claim 9, wherein partitioning the input data set into chunks of data involves partitioning the input data set so that the number of chunks of data equals the number of available computing nodes.

17. An apparatus that reduces execution time of a parallel support vector machine (SVM) application, comprising:

a processor; and processor, wherein the processor is configured to:

a memory coupled to the processor;

partition an input data set into chunks of data;

distribute the partitioned chunks of data across a plurality of available computing nodes;

execute the parallel SVM application on the chunks of data in parallel across the plurality of available computing nodes;

compute a mean of completion times for a portion of the plurality of available computing nodes that have completed processing their respective chunks of data;

set a first timeout period equal to a constant factor times the mean of the completion times minus a current elapsed time; and determine if the first timeout period has been exceeded before all of the plurality of available computing nodes have finished processing their respective chunks of data; and if so, to repartition the input data set into chunks of data that are different from the partitioned chunks of data;

redistribute the repartitioned chunks of data across some or all of the plurality of available computing nodes; and to execute the parallel SVM application on the repartitioned chunks of data in parallel across some or all of the available computing nodes.

18. The apparatus of claim 17, wherein if the first timeout period has been exceeded before all of the plurality of available computing nodes have finished processing their respective chunks of data, prior to repartitioning the input data set into different chunks of data, the processor is configured to:

cancel the execution of the parallel SVM application; and to delete results of the parallel SVM application.

19. The apparatus of claim 17, wherein while determining if the first timeout period has been exceeded before all available computing nodes have finished processing their respective chunks of data, the processor is configured to:

determine if a portion of the plurality of available computing nodes have completed processing associated chunks of data;

if not, to wait until the portion of the plurality of available computing nodes have completed processing their respective chunks of data.

20. The apparatus of claim 17, wherein if the first timeout period has not been exceeded before all available computing nodes have finished processing their respective chunks of data, the processor is configured to:

combine the results from each processed chunk of data;

execute the parallel SVM application to process the combined results;

compute the mean of the completion time for processing all chunks of data; and to set a second timeout period to a constant factor times the mean of the completion times for all chunks of data; and the processor is configured to:

determine if the second timeout period has been exceeded before the parallel SVM application has completed processing the combined results;

if so, to cancel the execution of the parallel SVM application on the combined results;

delete results of the parallel SVM application;

repartition the input data set into different chunks of data;

redistribute the repartitioned chunks of data across the plurality of available computing nodes; and to execute the parallel SVM application on the repartitioned chunks of data in parallel across some or all of the available computing nodes; and otherwise, to output the results.

* * * * *